US010503644B2

(12) United States Patent
Xu et al.

(10) Patent No.: US 10,503,644 B2
(45) Date of Patent: Dec. 10, 2019

(54) METHOD, DEVICE AND COMPUTER READABLE STORAGE MEDIA FOR MANAGING STORAGE SYSTEM

(71) Applicant: EMC IP Holding Company LLC, Hopkinton, MA (US)

(72) Inventors: Xinlei Xu, Beijing (CN); Ruiyong Jia, Beijing (CN); Liam Li, Beijing (CN); Lifeng Yang, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 15/954,735

(22) Filed: Apr. 17, 2018

(65) Prior Publication Data

US 2018/0300245 A1    Oct. 18, 2018

(30) Foreign Application Priority Data

Apr. 17, 2017   (CN) .......................... 2017 1 0250200

(51) Int. Cl.
| | |
|---|---|
| *G06F 12/08* | (2016.01) |
| *G06F 12/0817* | (2016.01) |
| *G06F 12/0811* | (2016.01) |
| *G06F 3/06* | (2006.01) |
| *G06F 12/0846* | (2016.01) |
| *G06F 12/0897* | (2016.01) |

(52) U.S. Cl.
CPC ........ *G06F 12/0828* (2013.01); *G06F 3/0604* (2013.01); *G06F 3/0611* (2013.01); *G06F 3/0634* (2013.01); *G06F 3/0689* (2013.01); *G06F 12/0811* (2013.01); *G06F 12/0846* (2013.01); *G06F 12/0897* (2013.01)

(58) Field of Classification Search
CPC ............ G06F 12/0828; G06F 12/0846; G06F 12/0811; G06F 12/0897; G06F 3/0604; G06F 3/0611; G06F 3/0634; G06F 3/0689
USPC ........................................................ 711/168
See application file for complete search history.

(56) References Cited

U.S. PATENT DOCUMENTS

| | | | | |
|---|---|---|---|---|
| 7,047,322 B1* | 5/2006 | Bauman | .............. | G06F 12/0835 710/33 |
| 2012/0159558 A1* | 6/2012 | Whyte | ................. | H04N 21/222 725/95 |
| 2015/0135243 A1* | 5/2015 | Whyte | ................. | H04N 21/222 725/93 |

* cited by examiner

*Primary Examiner* — Than Nguyen
(74) *Attorney, Agent, or Firm* — BainwoodHuang

(57) ABSTRACT

Embodiments of the present disclosure provide a method for managing a storage system, an apparatus and a computer readable storage medium. The method comprises: determining a permitted concurrency number for respective access to multiple storage devices in the storage system by a multi-level cache device of the storage system, the permitted concurrency number being associated with a state of the multiple storage devices; in response to receiving an access request for the storage system, determining a cache device in the multi-level cache device corresponding to the access request; determining whether a current concurrency number of access to the multiple storage devices in the cache device reaches the permitted concurrency number; and in response to determining that the current concurrency number fails to reach the permitted concurrency number, executing the access request for the storage system.

20 Claims, 8 Drawing Sheets

METHOD, DEVICE AND COMPUTER READABLE STORAGE MEDIA FOR MANAGING STORAGE SYSTEM

RELATED APPLICATIONS

This application claim priority from Chinese Patent Application Number CN201710250200.6, filed on Apr. 17, 2017 at the State Intellectual Property Office, China, titled "METHOD, DEVICE AND COMPUTER READABLE STORAGE MEDIA FOR MANAGING STORAGE SYSTEM" the contents of which is herein incorporated by reference in its entirety.

FIELD

Embodiments of the present disclosure generally relate to the field of storage management, and more specifically, to a method of managing a storage system, a device and a computer readable storage medium.

BACKGROUND

With the development of data storage techniques, various data storage devices have been capable of providing a higher data storage capacity for a user, and a data access speed is increased to a great extent. Apart from improving the data storage capacity, the user puts forward a growing demand for higher data reliability and a shorter response time of the storage system.

Nowadays, a technical solution based on a multi-level storage medium of different access speeds for establishing a storage system has been developed. For example, frequently used data may be loaded from a low access speed storage device to a cache device which has a high access speed, and further, the cache device is used to respond to the access request from an outside of the storage system. This technical solution may improve data response efficiency to a certain degree. However, when the storage device is failed, the cache device cannot acquire the response conditions of the storage device, and still sends a large amount of internal access requests, causing the storage device unable to respond to the user access requests within an effective time. Consequently, how to dynamically control the internal access request based on the operating conditions of the storage device becomes a hot issue.

SUMMARY

Embodiments of the present disclosure provide a solution of managing a storage system.

According to a first aspect of the present disclosure, a method of managing a storage system is provided. The method comprises: determining a permitted concurrency number for respective access to multiple storage devices in the storage system by a multi-level cache device of the storage system, the permitted concurrency number being associated with a state of the multiple storage devices; in response to receiving an access request for the storage system, determining a cache device in the multi-level cache device corresponding to the access request; determining whether a current concurrency number of access to the multiple storage devices in the cache device reaches the permitted concurrency number; and in response to determining that the current concurrency number fails to reach the permitted concurrency number, executing the access request for the storage system.

According to a second aspect of the present disclosure, a device for managing a storage system. The device comprises: at least one processing unit; at least one memory coupled to the at least one processing unit and storing instructions executed by the at least one processing unit, the instructions when executed by the at least one processing unit causing the device to execute actions, the actions comprising: determining a permitted concurrency number for respective access to multiple storage devices in the storage system by a multi-level cache device of the storage system, the permitted concurrency number being associated with a state of the multiple storage devices; in response to receiving an access request for the storage system, determining a cache device in the multi-level cache device corresponding to the access request; determining whether a current concurrency number of the cache device reaches the permitted concurrency number; and in response to determining that the current concurrency number fails to reach the permitted concurrency number, executing the access request for the storage system.

According to a third aspect of the present disclosure, a computer readable storage medium is provided. The computer readable storage medium comprises computer readable program instructions stored thereon, the computer readable program instructions when executed by a processing unit causing the processing unit to implement any step of the method as described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description of example embodiments disclosed herein with reference to the accompanying drawings, the above and other objectives, features, and advantages of example embodiments of the present disclosure will become more apparent, and in some example embodiments, identical reference signs generally represent identical components.

DETAILED DESCRIPTION OF EMBODIMENTS

Figure 1:
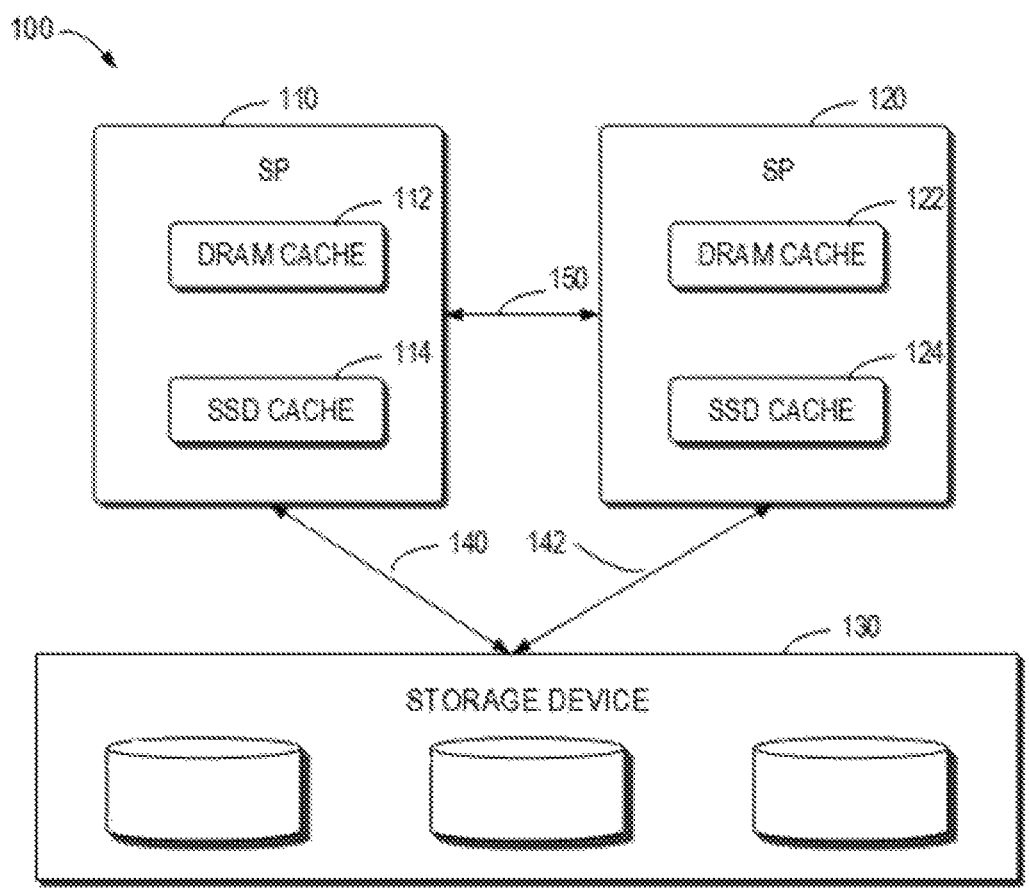
FIG. 1 is an architecture diagram illustrating a storage system according to embodiments of the present disclosure.

Preferred embodiments disclosed herein will now be described with reference to the drawings. Though the drawings illustrate preferred embodiments of the present disclosure, it should be appreciated that the present disclosure may be implemented in various forms but should not be confined to embodiments illustrated herein. Instead, these embodiments are provided to make the present disclosure clearer and more complete, and to convey the scope of the present disclosure exactly to those skilled in the art.

As used herein, the term "include" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" indicates "at least one another embodiment." The terms "first," "second," and the like may refer to different or same objects. Other definitions, explicit and implicit, may be included below.

As described above, in a traditional multi-level cache storage system, the multi-level cache cannot adjust internal access requests of the multi-level cache device based on the response of the storage device. When the storage device makes a slow response due to a great load or a failure occurs in a bottom device, the multi-level cache device still sends a number of internal access requests, resulting in malicious contentions for the bandwidth of the storage system, and this will result in that the storage system is unable to effectively respond to the user access requests to the storage system. Besides, when the cache device detects that the access request cannot be responded timely, throttling on user access requests may be started, bringing about a reduced system throughput, and a lot of user access requests thus cannot be implemented and multiple erroneous cases may occur.

In order to at least solve the above problem and other potential problems, embodiments of the present disclosure provide a solution for managing a storage system. In this solution, a concurrency number control mechanism is employed in a multi-level cache device, and prior to executing the user access requests or backend service requests, it is required to determine whether the current concurrency number of the cache device has reached a permitted concurrency number, thereby implementing a dynamic control of the access requests. Accordingly, in a case that the storage device makes a slow response, the backend service requests in the multi-cache device may be reduced by controlling the permitted concurrency number.

Providing such storage system with the concurrency number control mechanism may solve the problem that the storage system makes a slow response, because the system may reduce or even prohibit the backend service requests in the multi-level cache device by controlling the concurrency number, and in that case, the system only needs to respond to the access request to the storage system as initiated by the user.

In addition, providing such storage system with the concurrency number control mechanism may also effectively solve the problem that the performance of the storage system is dramatically worsening due to that there is at least a connection error between a processor and the storage device. A concurrency number control mechanism is provided in the multi-level cache in the multi-memory processor, such that the system can dynamically adjust the permitted concurrency number of each cache when detecting an error in the connection with the bottom server. Therefore the backend service requests in each storage processor can be reduced, and decreasing the number of backend service requests in the multi-memory processor would not involve in a contention for the access bandwidth against the access requests initiated by the user, improving a response speed of the storage system accordingly.

FIG. 1 is an architecture diagram of a storage system 100 according to embodiments of the present disclosure. It should be appreciated that the structure and function of the storage system 100, as shown in FIG. 1, are only used exemplarily, but not to imply any limitation to the scope of the present disclosure. Embodiments of the present disclosure may be embodied in different structures and/or functions.

As shown in FIG. 1, the storage system 100 may include two storage processors (SP, also called "storage node"), namely SP 110 and SP 120. SP 110 and SP 120 may respectively include one or more modules. In some embodiments, SP 110 may include a multi-level cache device. For example, as shown in FIG. 1, SP 110 may include two levels of cache devices, namely a Dynamic Random Access Memory (DRAM) cache 112 and a solid state disk (SSD) cache 114. Further, SP 110 may be coupled via a connection 140 to a storage device 130, and may write data temporarily stored in the cache into the storage device 130 at an appropriate time. The storage device 130 may be any nonvolatile storage medium currently known or to be developed in a future, such as a disk, a solid state disk (SSD), a disk array, or the like. SP 120 may have an identical structure to that of SP 110. For example, SP 120 may include one or more modules of the multi-level cache, and may be coupled via the connection 142 to the storage device 130.

In the storage system 100, SP 110 and SP 120 may be interconnected via a connection 150. In some embodiments, the connection 150 may be PCIe. In the case that SP 110 and SP 120 are interconnected via PCIe, if the connection 140 of SP 110 with the storage device 130 is failed, the access requests in SP 110 may be forwarded via PCIe to SP 120, and access for the storage device 130 may be implemented via SP 120.

Figure 2:
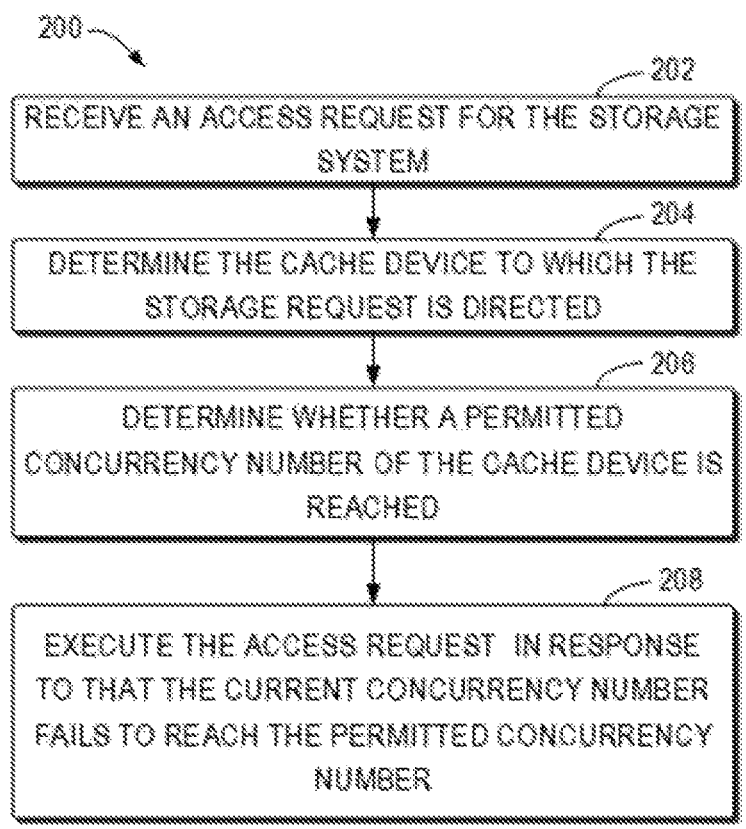
FIG. 2 is a flow chart of a method for managing the storage system according to embodiments of the present disclosure.

FIG. 2 is a flowchart of a method 200 for managing a storage system according to embodiments of the present disclosure. Actions involved in the method 200 will be described below with reference to the storage system 100 in FIG. 1. It should be appreciated that the actions described in the method 200 may be executed by SP 110 or SP 120. For the sake of discussion, the following actions are executed by SP 110 in the description below.

In block 202, SP 110 receives an access request for the storage system. In some embodiments, SP 110 may receive an IO request initiated by the user, such as a read request for a particular file initiated by the user. In some embodiments, the read request may be directly hit in the DRAM cache 112. In some embodiments, the read request may be hit in the SSD cache 114. In some embodiments, the storage device 140 is to serve the read request.

In some embodiments, SP 110 may receive a backend service request of the DRAM cache 112. In some embodiments, for example, a backend service request may include loading data in the storage device 130 into the DRAM cache 112. In some other embodiments, a backend service request may also include flushing a dirty page in the DRAM cache 112 into the storage device 130.

In some embodiments, SP 110 may receive a backend service request in the SSD cache 114. In some embodiments, for example, a backend service request may include loading data in the storage device 130 into the SSD cache 114. In some other embodiments, a backend service request may include flushing a dirty page in the SSD cache 114 into the storage device 130.

In block 204, SP 110 determines the cache device to which the access request is directed. In some embodiments, when the request may be a read request or write request initiated by the user, SP 110 determines that the access request is directed to the DRAM cache 112. In some embodiments, when the request is a backend service request of the DRAM cache 112, SP 110 determines that the access request is directed to the DRAM cache 112. In some embodiments, when the request is a backend service request of the SSD cache 114, SP 110 determines that the access request is directed to the SSD cache 114.

In block 206, SP 110 determines whether the cache device, to which the access is directed, reaches a permitted concurrency number.

Figure 3:
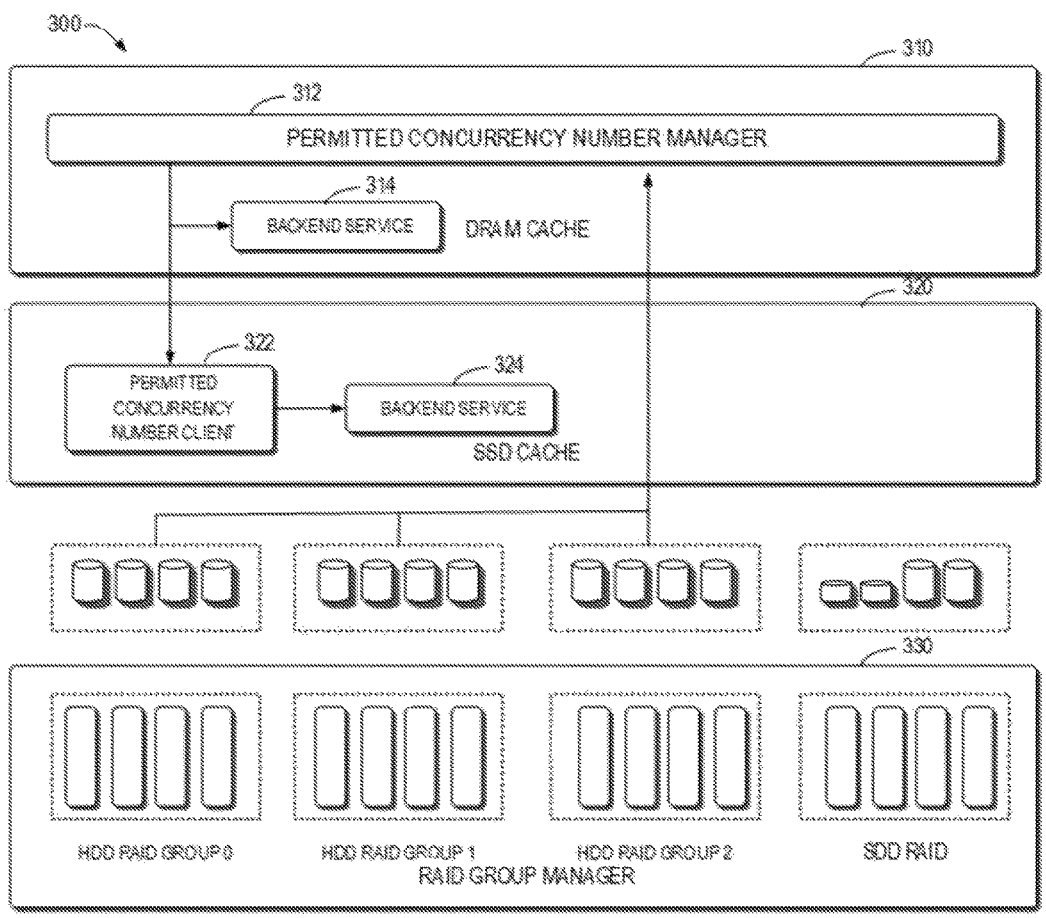
FIG. 3 is an architecture diagram of a storage controller according to embodiments of the present disclosure.

FIG. 3 is an architecture diagram of a storage controller 300 according to embodiments of the present disclosure, and SP 300 may be viewed as a specific implementation of SP 110 and SP 120. It should be appreciated that the structure and function of SP 300, as shown in FIG. 3, are provided exemplarily, but are not to imply any limitation to the scope of the disclosure. Embodiments of the present disclosure may be embodied in different structures and/or functions. The specific actions involved in determining whether the cache device to which the access request is directed reaches the permitted concurrency number will be described below with reference to FIG. 3.

In some embodiments, as shown in FIG. 3, the storage controller 300 may include a DRAM cache 310, a SSD cache 320 and a RAID group manager 330.

The DRAM cache 310 may include one or more modules. For example, as shown in FIG. 3, the DRAM cache 310 may include a permitted concurrency number manager module 312, which may be used for receiving permitted concurrency number information transmitted by the storage device, calculating the permitted concurrency number of the SSD cache 230, transmitting the permitted concurrency number to the SSD cache 320, and determining whether the concurrency number of the DRAM cache 310 reaches the permitted concurrency number. The DRAM cache 310 may also include a backend service module 314 for initiating and executing a backend service request, such as loading data, flushing a dirty page, and the like The SSD cache 320 may include one or more modules. For example, as shown in FIG. 3, the SSD cache 320 includes a permitted concurrency number client module 322, which may be used for receiving the permitted concurrency number of the SSD cache device 320 from the permitted concurrency number manager module 312, determining whether the concurrency number of the SSD cache 320 reaches the permitted concurrency number. The SSD cache 320 may include a backend service module 324 for initiating and executing a backend service request, such as loading data, flushing a dirty page, and the like The RAID group manager 330 is provided for managing a connection of SP 300 to the storage device, and generating one or more RAID groups for an upper-layer application from a space of the storage device. For example, as shown in FIG. 3, the RAID group manager 330 includes one or more HDD RAID groups. In some embodiments, the RAID group manager 330 may include one or more SDD RAID groups. In addition, the RAID group manger 330 may be provided for monitoring a connection state between SP 300 and the storage device and monitoring whether a failure occurs in the storage device, and the like In some embodiments, when the RAID group manager 330 creates one RAID group, the permitted concurrency number of the RAID group will be reported to the permitted concurrency number manager 312 in the DRAM cache 310. The permitted concurrency number of the RAID group may be calculated in the following equation:

$$C = n * d_t * r_t * S \quad (1)$$

wherein C denotes a permitted concurrency number of the RAID group, n denotes a number of drivers in the RAID group, $d_t$ denotes a permitted concurrency number of each single driver, $r_t$ denotes a type of the RAID group, and S is a constant corresponding to a state of the current RAID group.

In some embodiments, for a RAID group of a type RAID 5, the RAID group includes therein 5 SAS HDD drivers, one of which is a redundant driver, therefore $r_t=(5-1)/5=0.8$; the permitted concurrency number of each SAS HDD driver may be 10, i.e., $d_t$ is 10; the state of the current RAID group is simultaneously normal, i.e., S is 1, and the permitted concurrency number of the RAID group C=5*10*0.8*1=40.

In some embodiments, for a RAID group of a type RAID 6, the RAID group includes 6 SAS FLASH drivers, two of which are redundant drivers, $r_t$ thus is (6-2)/6; the permitted concurrency number of each FLASH HDD drive is 50, i.e., $d_t$ is 50; the state of the current RAID group is simultaneously normal, i.e., S is 1, and the permitted concurrency number of the RAID group C=6*50*2/3*1=200.

In some embodiments, when the RAID group controller 330 detects that the state of the RAID group is changed, the RAID group will update its permitted concurrency number and report the updated permitted concurrency number to the permitted concurrency number manager. For example, for a RAID group of a type RAID 5, when the system monitors that a driver in the RAID group is in an offline state, the RAID group will enter in a downgrading degradation state, and S may be set as 0.4 at this time. The updated permitted concurrency number of the RAID group is C=5*10*0.8*0.4=16.

In some embodiments, the permitted concurrency number manager 310 receives the permitted concurrency number of the RAID group from the RAID group controller 330 and updates the permitted concurrency number in response to a state change. The permitted concurrency number of the SSD cache 320 is calculated in the following equation:

$$C_f = C * o_d * r_d * P \quad (2)$$

wherein $C_f$ denotes the permitted concurrency number of the SSD cache, C denotes a permitted concurrency number of the RAID group, $o_d$ denotes a current available concurrency number proportion of the RAID group, $r_d$ denotes a parameter corresponding to an average response time of the RAID group, and P denotes a percentage constant of the SSD cache. And $o_d$ and $r_d$ are obtained by the DRAM permitted concurrency number manager 312 based on the current executing state of the DRAM cache 310.

In some embodiments, for a RAID group in which the permitted concurrency number is 200, the current available concurrency number is 180, i.e., $o_d$ is 180/200=0.9, an average response time is 5 ms, $r_d$ thus may be set as 1, and P may be set as 20%. Therefore the permitted concurrency number of the SSD cache $C_f$=200*0.9*1*0.2=36.

In some embodiments, when the concurrency number of the RAID group is increased and the response time is prolonged, the permitted concurrency number of the SSD cache 320 is reduced. For example, the permitted concurrency number of the RAID group is 200, the current available concurrency number is 50, i.e., $o_d$ is 50/200=0.4, the average response time is 500 ms, $r_d$ thus may be set as 0.2, and P may be set as 20%. Therefore the permitted concurrency number of the SSD cache $C_f=200*0.4*0.2*0.2=2$, in this case.

In some embodiments, the permitted concurrency number manager 312 regularly detects the current available concurrency number and the average response time, so as to dynamically adjust the permitted concurrency number of the SSD cache 320. For example, the permitted concurrency number manager 312 may perform detection per 5 seconds or 2 seconds.

Accordingly, the permitted concurrency number of the DRAM cache 310 is a result of deduction of the permitted concurrency number of the SSD cache 320 from the permitted concurrency number of the RAID group.

Having obtained respective permitted concurrency numbers, the DRAM cache 310 and the SSD cache 320 will compare current concurrency numbers in respective cache thereof with respective permitted concurrency numbers to determine whether the current concurrent numbers reaches the permitted concurrency numbers. For example, the current concurrency numbers and the permitted concurrency numbers of the DRAM cache 310 and the SSD cache 320 may be stored in respective data structures thereof.

Referring back to FIG. 2, in block 208, SP 110 executes an access request in response to determining that the current concurrency number fails to reach the permitted concurrency number.

In some embodiments, for a access request that is not hit directly in the DRAM cache 310, it may be determined by the permitted concurrency number manager 312 whether the current concurrency number of the DRAM cache 310 reaches the permitted concurrency number of the DRAM cache. The access request can be executed only when the current concurrency number fails to reach the permitted concurrency number of the DRAM cache.

In some embodiments, for the backend service request initiated by the backend service module 314 in the DRAM cache 310, it may be firstly determined by the permitted concurrency number manager 312 whether the concurrency number of the DRAM cache 310 reaches the permitted concurrency number of the DRAM cache. The backend service module 314 is permitted to execute the backend service request only when the current concurrency number fails to reach the permitted concurrency number.

In some embodiments, for the backend service request initiated by the backend service module 324 in the SSD cache 320, it may be determined by a permitted concurrency number client 322 whether the current currency number in the SSD cache 320 reaches the permitted cache number in the SSD cache 320. The backend service module 324 can be permitted to execute the backend service request only when the current currency number in the SSD cache 320 fails to reach the permitted concurrency number.

As seen from the above description, when the current concurrency number of the RAID is relatively great, i.e., most of the access requests have not been implemented, the embodiments of the present invention can dynamically reduce the permitted concurrency number of the SSD cache applicable to the backend services. Accordingly, an access pressure of the DRAM backend service and the SSD backend service with respect to the storage device may be released, and the access request to the storage device as initiated by the user is preferentially executed, improving a response performance of the storage device.

Figure 4:
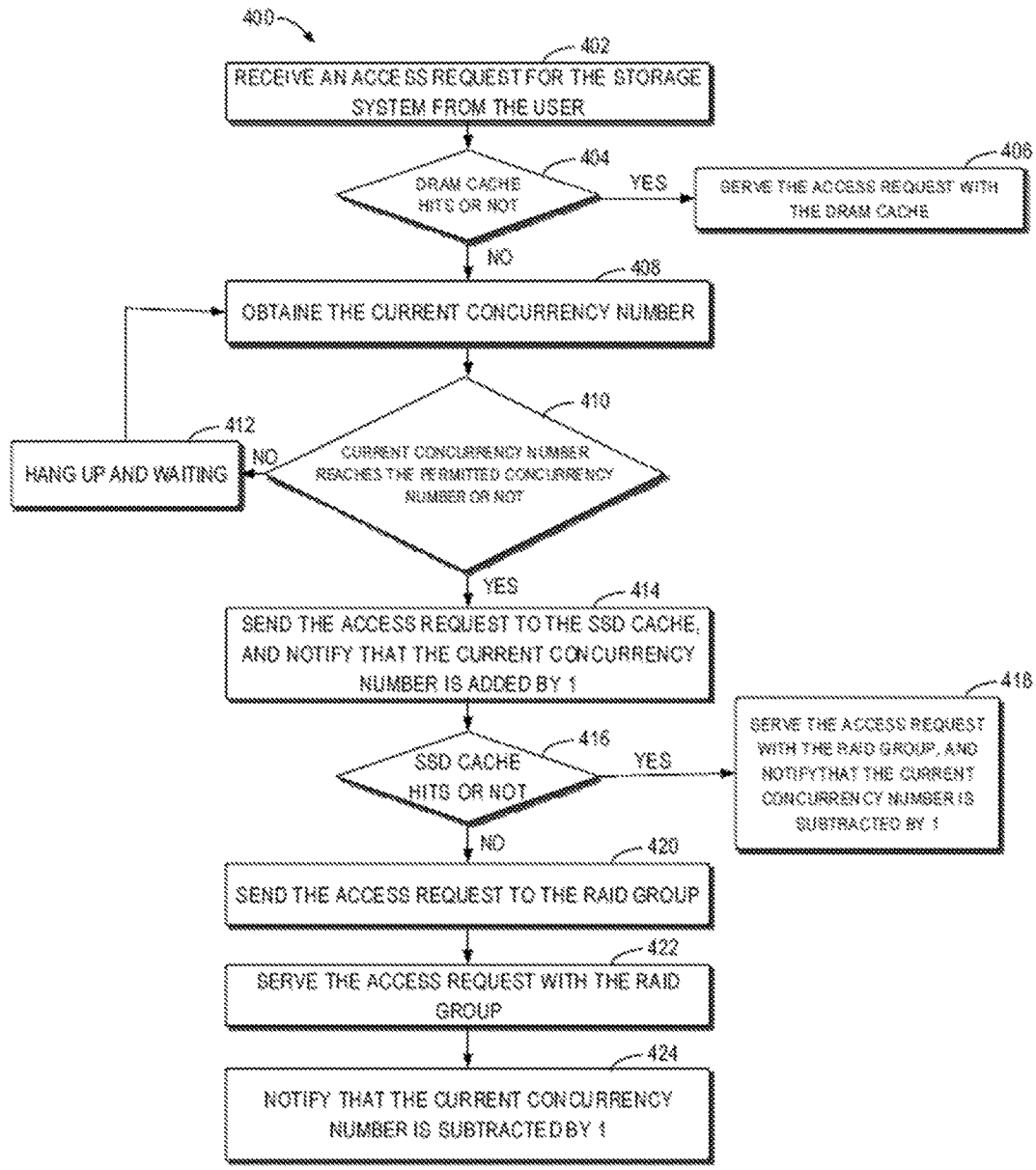
FIG. 4 is a flow chart of a method for processing a user access request to the storage system according to embodiments of the present disclosure.

FIG. 4 is a flow chart illustrating a method 400 for processing an access request to the storage system from a user, according to embodiments of the present disclosure.

For convenience of explanation, description of the process will be described with reference to SP 300 as described with reference to FIG. 3.

As shown in FIG. 4, in block 402, SP 300 receives the access request for the storage system from the user. The request may be a read request or write request. In block 404, the DRAM cache 310 may determine whether the DRAM cache 310 hits the access request. If the DRAM cache 310 directly hits the access request, processing may be performed in a conventional manner, i.e., the DRAM cache serves the access request. If the DRAM cache 310 fails hit the access request, the method 400 proceeds to block 408 to obtain the current concurrency number of the DRAM cache 310; otherwise the method 400 proceeds to block 406.

In block 408, the current concurrency number of the DRAM cache 310 may be obtained by the permitted concurrency number manager 312, and the operation then proceeds to block 410. In block 410, it is determined whether the current concurrency number reaches the permitted concurrency number of the DRAM cache 310 based on the current concurrency number of the DRAM cache 310 and the permitted concurrency number of the DRAM cache 310 calculated by the permitted concurrency manager 312. If the current concurrency number reaches the permitted concurrency number, the access request may be hanged up in block 412, and the method 400 returns to the block 408 after waiting for a period of time to re-gain the current currency number in the DRAM cache 310, until the current concurrency number of the DRAM cache 310 is smaller than the permitted concurrency number; otherwise, the method 400 proceeds to block 414.

In block 414, the access request is sent to the SSD cache 320, and the permitted concurrency number manager 312 is simultaneously notified that the current concurrency number of the DRAM cache 310 is added by 1. In block 416, it may be determined whether the SSD cache 320 hits the access request. If the SSD cache 320 hits the access request, the method 400 proceeds to block 418, wherein the SSD cache 320 serves the access request, and the permitted concurrency number manger 312 is simultaneously notified that the permitted concurrency number of the DRAM cache 310 is subtracted by 1; otherwise, the method 400 proceeds to block 420.

In block 420, the access request may be transmitted by the RAID group manager 330 to a RAID group. Then, in block 422, the RAID group is used to serve the access request, and after the access request is implemented, in block 424, the permitted concurrency manager 312 is notified that the permitted concurrency number of the DRAM cache 310 is subtracted by 1.

Figure 5:
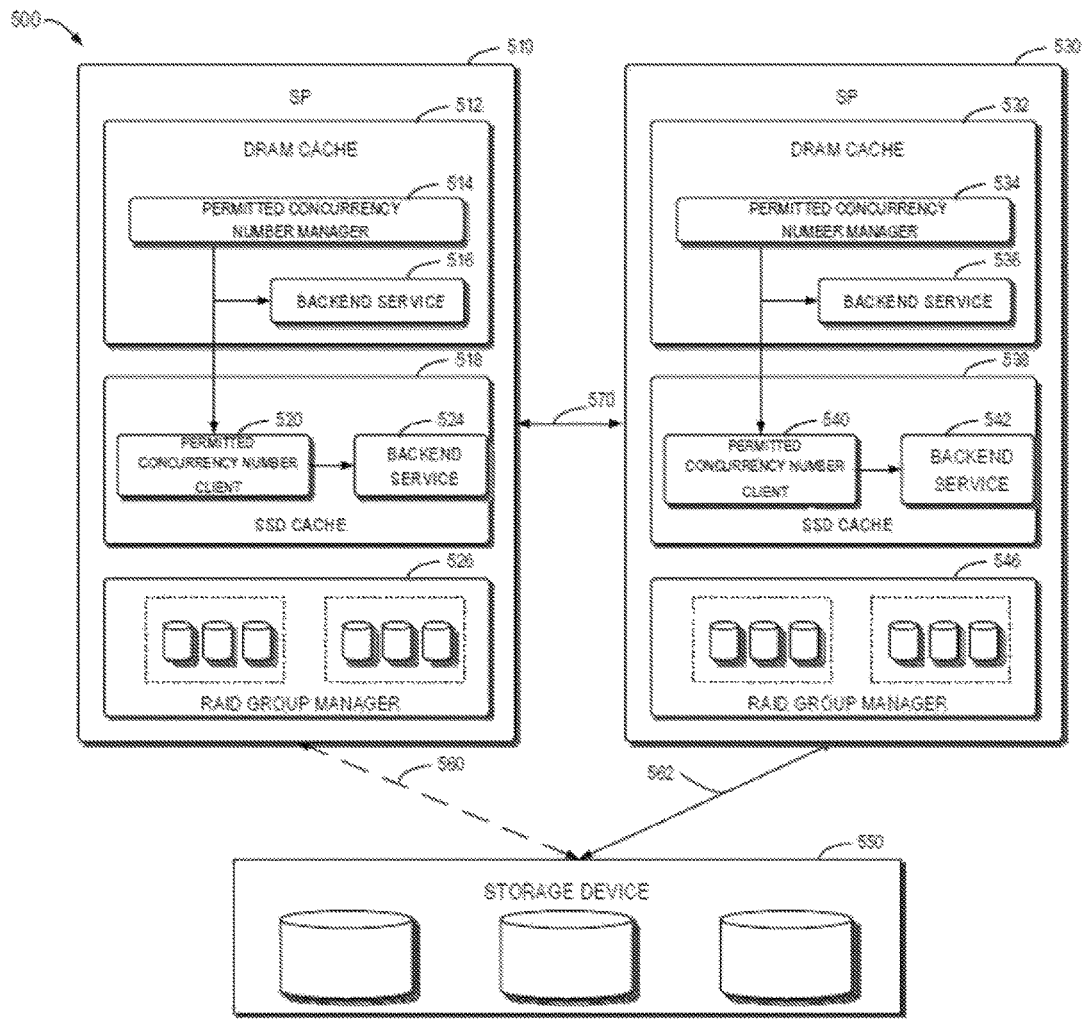
FIG. 5 is a block diagram of a multiple memory processors storage system according to embodiments of the present disclosure.
Figure 6:
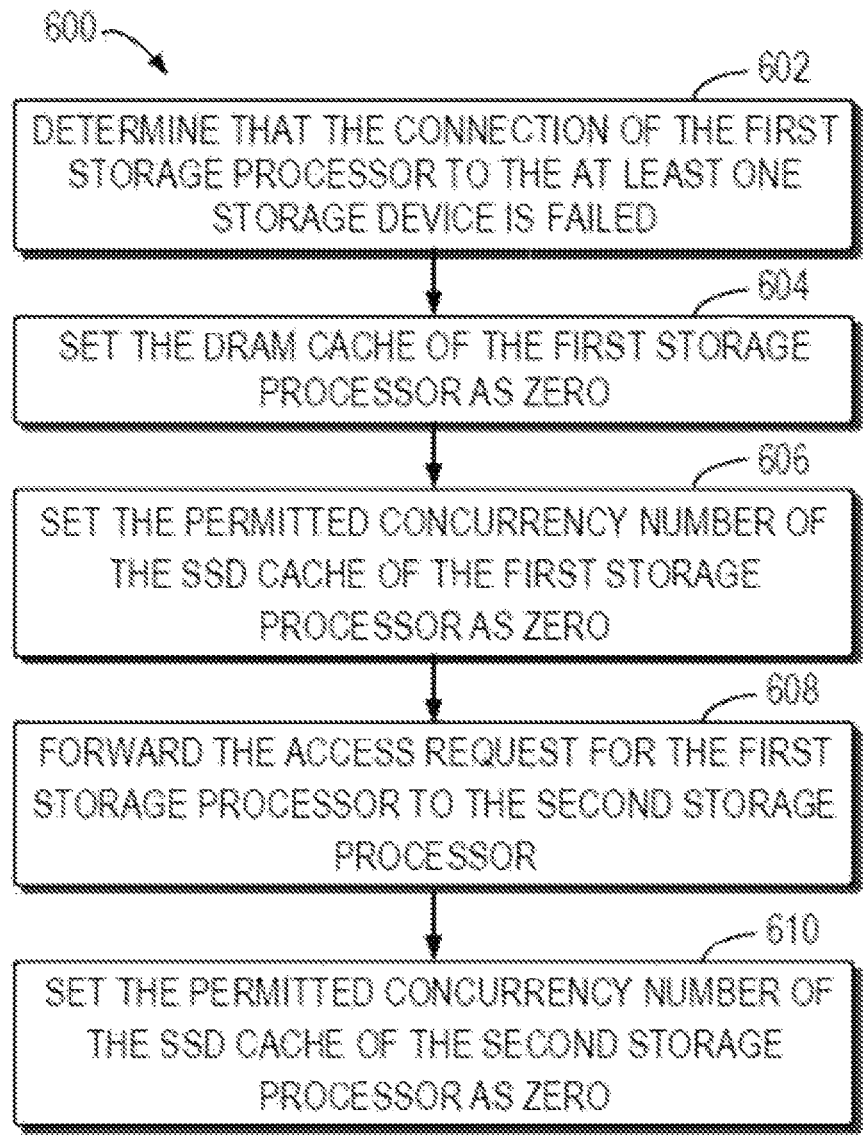
FIG. 6 is a flow chart of a method for processing a memory connection failure according to embodiments of the present disclosure.

The foregoing describes a process for adjusting execution of the access request in cache at each level dynamically in a single storage processor based on the execution state of the storage device. Referring to FIGS. 5 and 6, how to promote the storage system performance by utilizing the technical solution of the present disclosure in a multi-memory process scenario will be described in detail below.

FIG. 5 is a block diagram illustrating a multi-memory processor storage system 500 according to embodiments of the present disclosure.

The system 500 may be multiple storage controllers. For example, as shown in FIG. 5, the system 500 may include SP 510 and SP 530. SP 510 and SP 530 may respectively include one or more modules. In some embodiments, SP 510 may include multiple levels of cache devices. For example, as shown in FIG. 5, SP 510 may include two levels of cache devices, namely a DRAM cache 512 and an SSD cache 518.

The DRAM cache 512 may include one or more modules. For example, as shown in FIG. 5, the DRAM cache 512 may include a permitted concurrency number manager module 514 and a backend service module 516. The SSD cache 518 may include one or more modules. For example, as shown in FIG. 5, the SSD cache 518 includes a permitted concurrency number client module 520 and a backend service module 524. Moreover, SP 510 may also include a RAID group manager 526 for monitoring a connection state between SP 510 and a storage device 550 and monitoring whether a failure occurs in the storage device.

In addition, SP 510 may be coupled via a connection 560 to the storage device 550, and may write data temporarily stored in the cache into the storage device 550 at an appropriate time. The storage device 550 may be any nonvolatile storage medium currently known or to be developed in the future, such as a disk, a solid state disk (SSD), a disk array, or the like. SP 530 may have an identical structure to that of SP 510. For example, SP 530 may include one or more modules of the multi-level cache, and be coupled via a connection 562 to the storage device 550.

In the storage system 500, SP 510 and SP 530 may be interconnected via a connection 570. In some embodiments, the connection 560 may be PCIe. In the case that SP 510 and SP 530 are interconnected via PCIe, if the connection 560 of SP 510 to the storage device 550 is failed, the access request in SP 510 may be forwarded via PCIe to SP 530, and access for the storage device 540 is implemented via SP 530.

Referring to FIG. 6, the flowchart of processing the access request by the system, when the connection 560 of SP 510 to the storage device 550 is failed, will be described below. FIG. 6 is a flowchart of a method 500 for processing a memory connection failure according to embodiments of the present disclosure.

In block 602, a first RAID group manager 526 determines that the connection 560 of SP 510 to at least one disk of the storage device 550 is failed. In some embodiments, the first RAID group manager 526 determines that the failure occurs by detecting that one or more disks in the RAID group are offline.

In block 604, in response to determining that the connection 560 of SP 510 to the at least one disk of the storage device 550 is failed, a first permitted concurrency number manager 514 sets the permitted concurrency number of the first DRAM cache 512 in SP 510 as zero. In some embodiments, when detecting that the connection 560 of SP 510 to at least one disk of the storage device 550 is failed, the first RAID group manager 526 sends a failure notification to the permitted concurrency number manager 514, and allows the permitted concurrency number manager 514 to set the permitted concurrency number of the first DRAM cache 512 as zero. As a result, the access request of the DRAM cache 512 which is not directly hit would not be responded, and responses to the backend service request of the DRAM cache 512 initiated by the first backend service module 516 in the first DRAM cache 512 would not be terminated, such that the access pressure of the storage device is alleviated.

In block 606, SP 510 sets the permitted concurrency number of the first SSD cache 518 as zero. In some embodiments, SP 510 sends, via the first permitted concurrency number manager 514, to the first concurrency number client 520 a notification that the permitted concurrency number of the first SSD cache 518 is set as zero. In response to the notification, the first concurrency number manager 518 stops responding to the backend service requests of the SSD cache 518 sent by the backend service module 524, so as to further release the access pressure of the storage device.

In block 608, SP 510 forwards the access request thereof to SP 530 via the connection 570. In some embodiments, the connection 570 is PCIe. SP forwards the access request, which is not directly hit in the first DRAM cache 512, via PCIe to the second DRAM cache 532 of SP 530, so as to continue responding to the user access request.

In block 610, in response to a failure of the connection 560 of SP 510 to the storage device 550, SP 530 sets the permitted concurrency number of the second SSD cache 538 in SP 530 as zero. In some embodiments, when detecting that the connection 560 is failed, the first RAID group manager 526 notifies the failure via the connection 570 between 510 and 530 to the second RAID group manager 546, and the second RAID group manager 546 notifies the failure in turn to the second permitted concurrency number manager 534. In response to this notification, the second permitted concurrency number manager 534 notifies the second concurrency number client 540 that the permitted concurrency number of the second SSD cache 538 is set as zero. Then the second concurrency number manager 540 stops responding to the backend service request of the SSD cache 538 sent by the backend service module 542.

As seen from the above description, in a case that the connection of one or more storage processors in the multi-memory processor storage system to the storage device is failed, all backend service requests in SSD cache not to be responded any longer with the concurrency number mechanism. The backend service requests of the DRAM cache in the failed storage processor are not to be responded any longer, and the access requests which are not directly hit in the DRAM cache are not to be responded by the failed storage processor. Therefore a contention for the limited access bandwidth is avoided, such that the storage device can preferentially serve the access requests initiated by the user and timeout of the access response time resulting from access overloading of the memory may be prevented.

Figure 7:
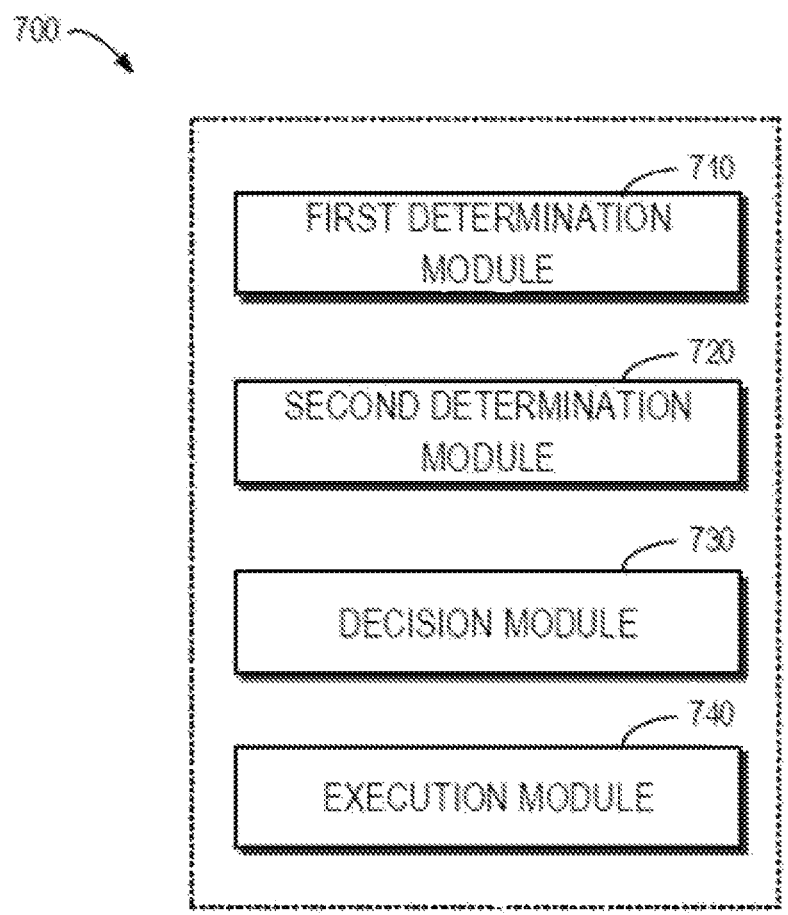
FIG. 7 is a block diagram of an apparatus for managing storage system according to embodiments of the present disclosure.

FIG. 7 is a block diagram of an apparatus for managing storage system according to embodiments of the present disclosure. For example, any one of SP 110-120, as shown in FIG. 1, and SP 510 and SP 530, as shown in FIG. 5, may be implemented by an apparatus 700. As shown in FIG. 7, the apparatus 700 may include a first determination module 710 which is configured to determine a permitted concurrency number for respective access to the multiple storage devices in the storage system by the multi-level cache device of the storage system and the permitted concurrency number is associated with the state of multiple storage devices. The apparatus 700 may comprise a second determination module 720 configured to determine a cache device in multiple levels of cache devices corresponding to the access request. The apparatus 700 may further include a decision module 730 configured to determine whether the current concurrency number of access to multiple storage devices in the cache device reaches the permitted concurrency number. Moreover, the apparatus 700 may also include an execution module 740 configured to execute the access request for the storage system, in response to determining that the current concurrency number fails to reach the permitted concurrency number.

For clarity, some optional modules of the apparatus 700 are not shown in FIG. 7. However, it should be appreciated that each feature, as described above with reference to FIGS. 1-6, is applicable to the apparatus 700. Besides, each module of the apparatus 700 may be a hardware module, or may be a software module. For example, in some embodiments, the apparatus 700 may be implemented partially or fully using software and/or firmware, and for example is implemented as a computer program product included on a computer readable medium. Alternatively or additionally, the apparatus 700 may be implemented partly or fully based on hardware, and for example may be implemented as an integrated circuit (IC), an Application-specific Integrated Circuit (ASIC), a System-on-a-chip system (SOC), a Field-Programmable Gate Array (FPGA), and the like. The scope of the present disclosure is not limited in this aspect.

Figure 8:
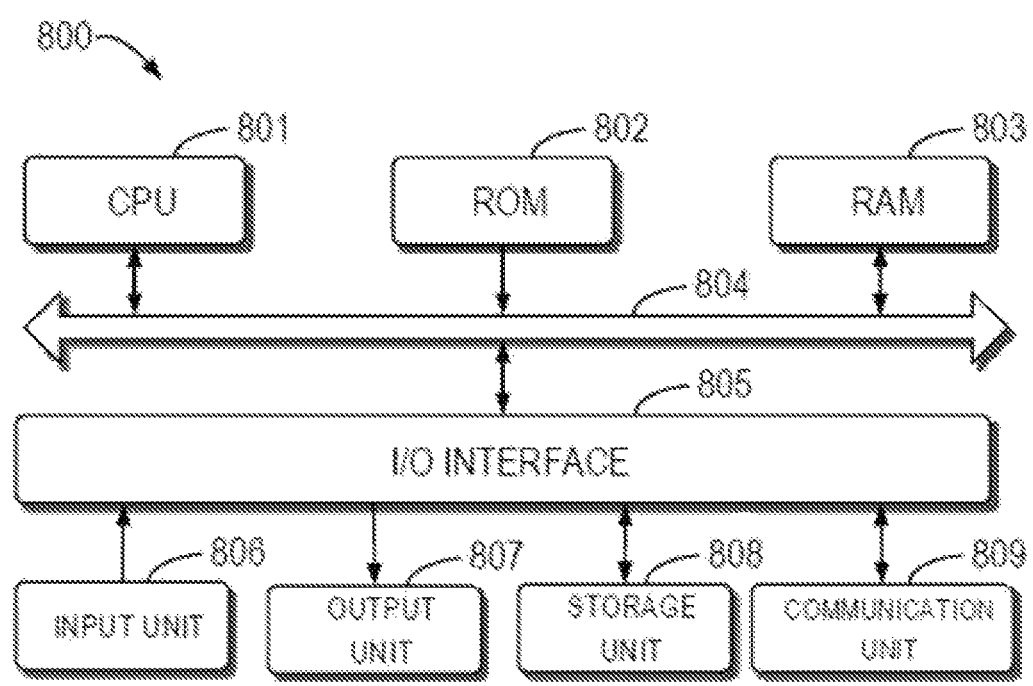
FIG. 8 is a schematic block diagram of an example device for implementing embodiments of the present disclosure.

FIG. 8 is a schematic diagram of an example device 800 for implementing embodiments of the present disclosure. For example, any one of SP 110-120, as shown in FIG. 1, and SP 510 and SP 530, as shown in FIG. 5, may be implemented by the device 800. As shown therein, the device 800 may include a central processing unit (CPU) 801 that may execute various appropriate actions and processing based on computer program instructions stored in a read-only memory (ROM) 802 or computer program instructions loaded from a storage unit 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

Multiple components in the device 800 are connected to the I/O interface 805: an input 806, such as a keyboard, a mouse and the like; an output unit 807, such as various types of displays, a loudspeaker, and the like; a memory unit 808, such as a magnetic disk, an optical disk, and the like; a communication unit 809, such as a network card, a modem, a wireless communication transceiver, and the like. The communication unit 809 allows the device 800 to exchange information/data with other devices through a computer network such as the Internet and/or various types of telecommunications networks.

Various processes and processing described above, e.g., the method 200 or 400, may be executed by the processing unit 801. For example, in some embodiments, the method 200 and/or 400 may be implemented as a computer software program that is tangibly embodied on a machine readable medium, e.g., the storage unit 808. In some embodiments, part or all of the computer programs may be loaded and/or mounted onto the device 800 via ROM 802 and/or communication unit 809. When the computer program is loaded to the RAM 803 and executed by the CPU 801, one or more steps of the method 200 and/or 400 as described above may be executed.

The present disclosure may be a method, a device, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processing unit of the computer or other programmable data processing apparatus, create means for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a storage system, comprising:
    determining a permitted concurrency number for respective access to multiple storage devices in the storage system by a multi-level cache device of the storage system, the permitted concurrency number being associated with a state of the multiple storage devices;
    in response to receiving an access request for the storage system, determining a cache device in the multi-level cache device corresponding to the access request;
    determining whether a current concurrency number of access to the multiple storage devices in the cache device reaches the permitted concurrency number; and
    in response to determining that the current concurrency number fails to reach the permitted concurrency number, executing the access request for the storage system.

2. The method according to claim 1, further comprising:
    in response to determining that the current concurrency number reaches the permitted concurrency number, hanging up the access request.

3. The method according to claim 1, wherein the multi-level cache device includes two levels of cache devices, respectively a first cache device and a second cache device.

4. The method according to claim 1, wherein determining a permitted concurrency number for respective access to multiple storage devices in the storage system by a multi-level cache device of the storage system comprises:
    calculating, based on a total driver number, a driver type, a disk array type and a disk array group state in the multiple storage devices, a total permitted concurrency number of the multi-level cache device; and
    calculating, based on the total permitted concurrency number of the multi-level cache device, a completion condition of a disk array group, an average response time of a disk array group and a distribution percentage of each level of cache device, a permitted concurrency number of respective access to the storage processor by the multi-level cache device.

5. The method according to claim 3, wherein the storage system includes a first storage processor and a second storage processor.

6. The method according to claim 5, further comprising:
    determining that a connection of the first storage processor to at least one of the multiple storage devices is failed;
    setting the permitted concurrency number of the multi-level cache device in the first storage processor as zero.

7. The method according to claim 6, further comprising:
    setting the permitted concurrency number of the first cache device in the first storage processor as zero;
    setting the permitted concurrency number of the second cache device in the first storage processor as zero;
    forwarding the access request for the first storage processor to the second storage processor; and
    setting the permitted concurrency number of the second cache device in the second memory processor as zero.

8. The method according to claim 1, wherein the multiple storage devices are disk drivers.

9. The method according to claim 3, wherein the first cache device is a dynamic random access memory cache device.

10. The method according to claim 3, wherein the second cache devices is a solid state disk cache device.

11. A device for managing a storage system, comprising:
    at least one processing unit;
    at least one memory coupled to the at least one processing unit and storing instructions executed by the at least one processing unit, the instructions when executed by the at least one processing unit causing the device to execute actions, the actions comprising:
        determining a permitted concurrency number for respective access to multiple storage devices in the storage system by a multi-level cache device of the storage system, the permitted concurrency number being associated with a state of the multiple storage devices;

in response to receiving an access request for the storage system, determining a cache device in the multi-level cache device corresponding to the access request;

determining whether a current concurrency number of the cache device reaches the permitted concurrency number; and in response to determining that the current concurrency number fails to reach the permitted concurrency number, executing the access request for the storage system.

12. The device according to claim 11, the actions further comprising:

in response to determining that the current concurrency number reaches the permitted concurrency number, hanging up the access request.

13. The device according to claim 11, wherein the multi-level cache device includes two levels of cache devices, respectively a first cache device and a second cache device.

14. The device according to claim 11, wherein determining a permitted concurrency number for respective access to multiple storage devices in the storage system by a multi-level cache device of the storage system comprises:

calculating, based on a total driver number, a driver type, a disk array type and a disk array group state in the multiple storage devices, a total permitted concurrency number of the multi-level cache device;

calculating, based on the total permitted concurrency number of the multi-level cache device, a completion condition of a disk array group, an average response time of a disk array group and a distribution percentage of each level of cache device, a permitted concurrency number of respective access to the storage processor by the multi-level cache device.

15. The device according to claim 13, wherein the storage system includes a first storage processor and a second storage processor.

16. The device according to claim 15, the actions further comprising:

determining that a connection of the first storage processor to the multiple storage devices is failed;

setting the permitted concurrency number of the multi-level cache device in the first storage processor as zero.

17. The device according to claim 16, the actions further comprising:

setting the permitted concurrency number of the first cache device in the first storage processor as zero;

setting the permitted concurrency number of the second cache device in the first storage processor as zero;

forwarding the access request for the first storage processor to the second storage processor; and setting the permitted concurrency number of the second cache device in the second memory processor as zero.

18. The device according to claim 11, wherein the multiple storage devices are disk drivers.

19. The device according to claim 13, wherein the first cache device is a dynamic random access memory cache device.

20. The device according to claim 13, wherein the second cache devices is a solid state disk cache device.

* * * * *